April 30, 1935.　　　V. F. ZAHODIAKIN　　　1,999,494
PISTON RING
Original Filed May 1, 1933
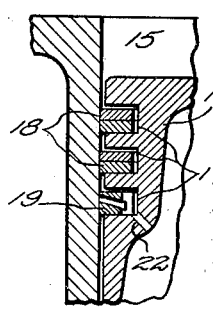
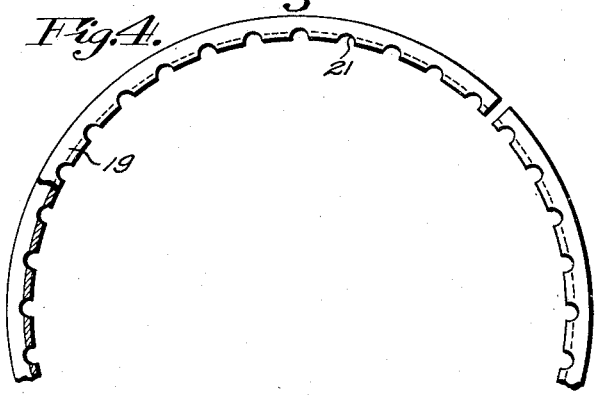
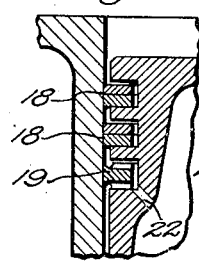
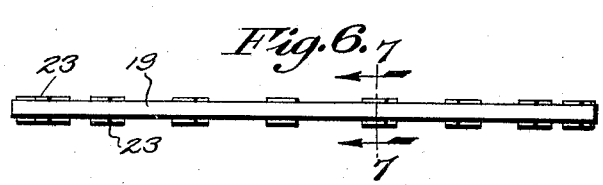
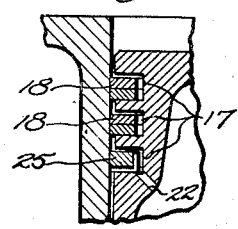
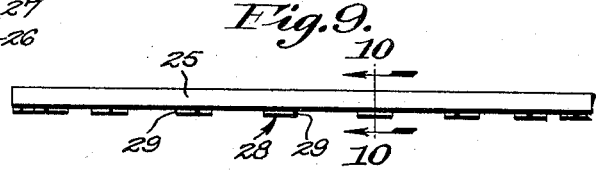
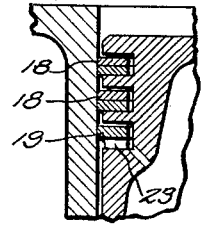
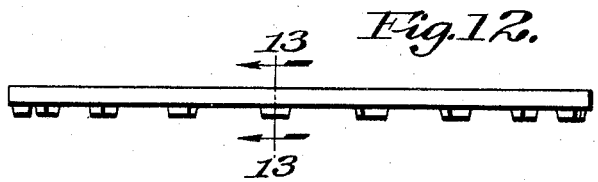
INVENTOR
Victor F. Zahodiakin
BY Wood & Wood,
ATTORNEYS Patented Apr. 30, 1935

1,999,494

UNITED STATES PATENT OFFICE 1,999,494

PISTON RING

Victor F. Zahodiakin, New York, N. Y.

Application May 1, 1933, Serial No. 668,713
Renewed February 9, 1935

2 Claims. (Cl. 309—43)

This invention relates to internal combustion engines and is particularly directed to improvements in oil regulating and compression rings conventionally used with the pistons of the engine for providing a sealing fit between the piston and the cylinder wall.

The average piston generally includes three piston rings mounted in respective grooves, these rings being for the purpose of expanding outwardly and engaging the cylinder wall, whereby compression of gas above the cylinder is possible and the oil being distributed below the piston cannot enter the combustion chamber by way of the cylinder bore. It is of paramount importance that a positive seal and a positive control of oil be established so that leakage of oil into the combustion chamber will not occur to cause fouling of plugs, oil losses and other undesirable results which are well known in the art.

It is the object of this invention to provide an improved oil regulating piston ring for more efficiently controlling and directing the oil distributed on the cylinder bore wall preventing escape of oil into the combustion chamber and insuring positive return of the excess oil from the cylinder wall back into the crank case.

It is a further object of this invention to provide an improved one-piece oil regulating piston ring which provides for positive removal of the excess oil from the cylinder wall for either direction of movement of the piston and which directs this excess oil under considerable force through the oil discharge passageways of the ring for flushing the same.

Other objects and further advantages will be more fully apparent from a description of the accompanying drawing, in which:

Figure 1 is a fragmentary sectional view of a portion of a cylinder and piston illustrating the improved piston ring of this invention incorporated therein.

Figure 2 is a side elevation of the improved piston ring showing it removed from the piston.

Figure 3 is a sectional view taken on line 3—3, Figure 2, detailing the arrangement of oil passageways in the ring.

Figure 4 is a plan view of the piston ring.

Figure 5 is a fragmentary sectional view taken through a portion of a cylinder and piston illustrating a modified form of the piston ring of this invention.

Figure 6 is a side view of the modified ring of Figure 5.

Figure 7 is a sectional view taken on line 7—7, Figure 6.

Figure 8 is a fragmentary sectional view taken through a portion of a cylinder and piston, illustrating a further modification of the piston ring.

Figure 9 is a side elevation of the piston ring of Figure 8.

Figure 10 is a sectional view taken on line 10—10, Figure 9.

Figure 11 is a fragmentary sectional view showing a still further modified piston ring.

Figure 12 is a side elevation of the piston ring of Figure 11.

Figure 13 is a sectional view taken on line 13—13, Figure 12.

For the purpose of an understanding of the improved piston ring, a typical environment is illustrated in Figure 1 consisting of a cylinder 15 and piston 16. The piston 16 is of hollow design and has, in the particular case, three piston ring grooves 17 and piston rings in the respective grooves. Two of the piston rings, namely 18, 18, are compression rings as illustrated, whereas the other ring 19 is designed for regulation of the oil.

The improved piston ring 19 is split in the conventional fashion for flexibility radially and for insertion in the groove. Its outer periphery includes a circumferential groove or slot 20, this groove being inclined downwardly inwardly as disposed in position of use. A series of circular grooves 21 are cut in the inner periphery of the ring substantially at right angles to and intersecting the groove, communication thus being provided between the outer and inner peripheries of the ring.

Therefore, the excess oil is free to drain through the ring into the portion of the groove 17 in back of the ring and thence downwardly through a series of inclined ports 22 in the piston to the interior of the piston and thence to the crank case. The circumferential groove or slot provides for uniform reception of the excess oil and the quantity of excess oil delivered into this groove is quickly drained off through the series of grooves described.

In the modification shown in Figures 5 to 7 inclusive, a solid ring is provided including teeth 23 on its upper and lower sides, these teeth being spaced sufficiently to provide ample clearance for oil flow above and below the ring to the oil drainage openings 22 in the bottom of the groove. The teeth are of a length less than the width of the ring and circumferential clearance is left around the ring on its upper and lower sides toward the outer periphery thereof for receiving the oil from the cylinder bore.

The outer periphery of the ring is widened or flared providing relatively sharp circumferential edges 24 which act to scrape the excess oil from the cylinder in both directions of movement of the piston. The oil scraped off is delivered across the top and bottom surfaces of the ring between the teeth at considerable pressure due to the rapidity of reciprocation of the piston and constantly maintains these surfaces free of carbon and débris for continued efficient operation of the ring. In Figures 11 to 13 inclusive the teeth 23 are only provided on the bottom of the ring.

The modification shown in Figures 8 to 10 inclusive includes a solid split ring 25 and a split expander and spacer ring 26. The ring 26 is angular in cross section with the angle facing outwardly. The cylindrical flange 27 of this ring is solid whereas the base flange 28 is notched as at 29. The piston ring 25 rests within the angle of the ring 26 and upon the flange 28 thereof. Since the notches 29 extend through the bend of the angular ring, the oil passes through the notches under the ring 25 to the rear of the piston groove for drainage.

Having described my invention, I claim:

1. A piston ring, comprising, a split annulus, and a split expander ring, said expander ring being angular in cross section with the angle facing outwardly and the split annulus disposed in said angle and resting on the lower flange and the lower flange having cross notches therein extending through the bend of the angle, whereby the lower flange permits the flow of oil under the annulus through the notches.

2. In combination with the piston and cylinder of an internal combustion engine, the piston being of hollow construction and including an annular ring receiving groove in its periphery, a piston ring in said groove, comprising, a one-piece split annulus under outward pressure against the cylinder bore, a split expander ring of angular outwardly facing cross section, said split annulus disposed in the angle of said expander ring, said expander ring having its base flange notched through the bend of the angle whereby the oil may pass between the split annulus and the piston groove wall, and said piston having oil drainage passageways extending from the bottom of the groove to the interior of the piston.

VICTOR F. ZAHODIAKIN.